Patented Feb. 11, 1930

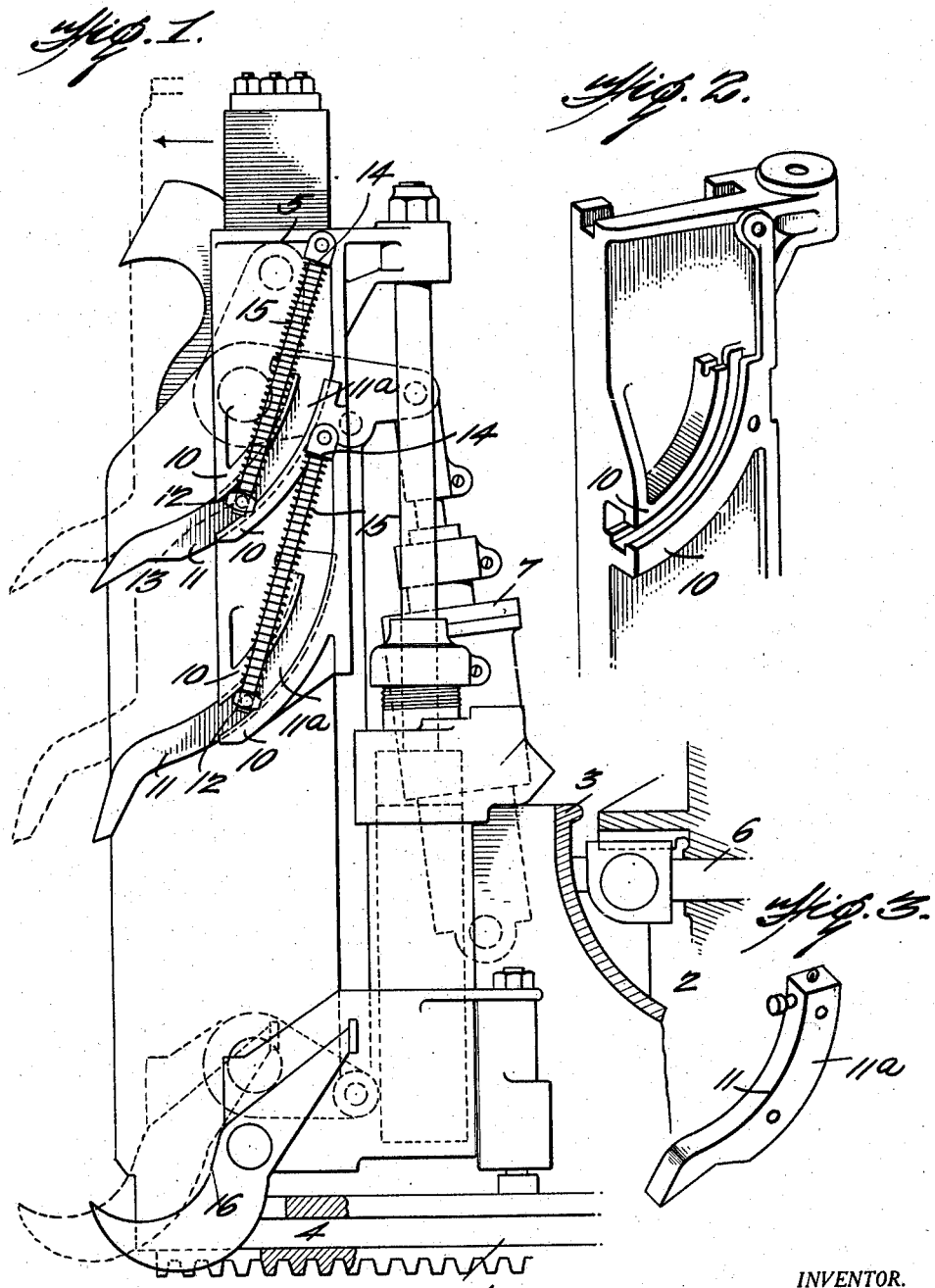

1,746,554

UNITED STATES PATENT OFFICE

GEORGE M. PELTON, OF MILWAUKEE, WISCONSIN, ASSIGNOR TO THE FILER & STOWELL CO., OF MILWAUKEE, WISCONSIN, A CORPORATION OF WISCONSIN

SAWMILL CARRIAGE

Application filed May 18, 1928. Serial No. 278,845.

This invention relates to an improvement in a dog and its mountings for saw mill carriages.

I am aware it is old in the art to mount dogs to be swung or moved by log contact when a log is thrown onto a carriage, but in all instances known to me, such mountings will not permit movement of the dogs under all practical conditions. Hence, in numerous instances, considerable difficulty and delay have been experienced, due to breakage or jamming of the dogs under log contact when thrown up against the knees by the nigger.

The prime object of this invention is to provide a dog and mounting to overcome the objection noted, so that in any position of log contact against the knee, if a dog is in the path of the log, the dog will yield and recede within the knee.

A further object of the invention is to provide a dog and mounting so constructed and arranged in a knee that when a log contacts with a dog, the latter will yield and prevent breakage or jamming.

Another object of the invention is to provide a mounting for a group of dogs which may be moved a maximum or minimum distance from the face of a knee, and at the same time arrange each dog in such manner that it will recede under log contact and avoid breakage or jamming, irrespective of its position with respect to the face of the knee.

The invention also comprehends improvements in the details of construction and arrangement of parts which will be hereinafter described and pointed out in the claims.

In the accompanying drawings:—

Fig. 1 is an elevation of a knee, with my improved dog and dog mounting applied thereto.

Fig. 2 is a detail perspective view of a portion of the dog frame.

Fig. 3 is a detail view of one of the dogs.

1 indicates a saw mill carriage, and mounted on same is a knee 2. As shown, the knee is formed in two parts 3 and 4, for taper purposes, and mounted within the knee is a dog carrying frame 5. The upper part 3 of the knee is operated through the medium of a fluid actuated piston and cylinder arrangement 6, while the dog carrying frame is advanced, or retracted in the knee through the medium of a fluid pressure piston and cylinder arrangement 7.

The parts thus far described form no part of the present invention and are disclosed merely for the purpose of illustrating the application of the invention. Such parts however, are disclosed more or less in my co-pending application, Serial No. 192,723 filed May 19, 1927.

The invention per se involved in the present application relates primarily to the dog and dog mounting, which will now be described in detail.

The dog carrying frame 5 is provided with pairs of semi-circular flanges 10 to form curved guideways, and extend from the front edge of the frame inwardly and upwardly of the latter. The frame may have one, two or more pairs of flanges to accommodate additional dogs, this depending entirely on the size of the rigs on which the invention is applied. In the instant case but two guideways are shown.

Mounted in each guideway is a dog 11. The shank $11^a$ of each dog is semi-circular and fits between a pair of flanges 10, consequently the shank moves in its guideway whenever the dog yields. The upper dog shown in the drawing is bevelled downwardly and sharpened at its lower end to readily take into the edge of a board or log when driven down by the fluid pressure mechanism. The free end of the lower dog is shaped differently than the upper dog, in that from its curved shank, it is extended downwardly and somewhat tapered to afford an appropriate angle for the blow of the body of a log when thrown on the carriage. In other words, when the dogs are in raised position preparatory to being driven into a board or log, the position of the upper dog is such as to be out of the way of an ordinary size log, and when an unusually large log contacts with it, the angle of the blow will be different than if the log made contact with the lower dog, while the position of the lower dog is such that it is in the path of a log and is consequently struck thereby when loading the carriage, and the angle of the blow is different than that on the upper dog.

Extending from each shank is a pivot pin 12, provided at its end with a head formed with an opening 13. Mounted on a pin above the dog is a headed rod 14, which extends through the opening 13 in the pin 12, and between the latter and the head of rod 14 is a spring 15. The tension of the spring is such as to force the dog down in its guideway in position to engage a log.

Cooperating with the two upper dogs is a bottom dog 16, which is pivotally mounted on the fluid operated mechanism for actuating the dogs.

In operation, if the dogs are to be used to engage a board, the dog carrying frame is retracted in the knee, as shown in full lines in Fig. 1 of the drawing. When in this position, the sharpened ends of the dogs are at a minimum distance from the face of the knee, and if the width of the board is such as to extend over the lower dog upon board contact, the lower dog will be forced inwardly in its guide against the tension of its spring. At this time, the upper dog is above the edge of the board, so that upon downward movement of the dog, it will readily engage the board, and at the same time, the bottom dog will be raised and engage the bottom edge of the board.

The greatest difficulty with dogs now in use is when they are projected to their maximum distance beyond the face of the knee, as shown in dotted lines in Fig. 1. That is, when the dog carrying frame is advanced in the knee, of course the dogs are carried beyond the face of the knee, and they are subjected to the blow from log contact when a log is thrown toward the knee by the nigger.

According to this invention, let it be assumed the dogs are projected their maximum distance, it follows if a log should be thrown against the knee and contact with the free end of either or both of the dogs at any angle within the range of log contact or capable of being handled by a knee of a definite height, said dog or dogs will be forced in the guideway or guideways against the tension of the springs. The location of the guideway and the curvature thereof and the shape of the free ends of the dogs are such that pressure applied by log contact against the tension of the springs will readily permit the dog to yield and ride in the guideway and thus prevent breakage or damage to the dogs. Furthermore, by mounting the dogs so that they will individually yield under log pressure, they will at all times be in position with reference to the curvature or irregularities of the log surface to bite into the log when the frame is driven down to engage the dogs with the log to hold same against the knee.

There are two essential characteristics of the present invention which cooperate to produce an effective commercial structure. The first and most important of these is the fact that the dogs are mounted in curved guides and are themselves curved in coincidence with the guides, and the second important feature is that the dogs are capable of independent retractive movement to avoid breakage. The first of these features lends itself to a result which, so far as known, has never previously been produced in dogging mechanism. This result is that when the power forces the tooth or dog into the cant or log, the curved mounting and movement of the dog insures that this operation, instead of moving the log or cant away from the knee, holds the log or cant rigidly against the knee. It will be apparent that with the curved mounting and the correspondingly curved dog, as the tooth enters the log its position is absolutely locked against movement away from the knee, for the curved plane is such that in order to permit the dog and thereby the log to move further from the knee, the dog must move downwardly, and this is impossible owing to the log and dog engagement. Therefore, the curved mounting insures that on contact of the dog with the log, relative movement of the log away from the knee is impossible, and this is absolutely the result of the curved dog and curved mounting therefor.

The second feature involving the independence of the dogs in their movement toward the knee is also correlated to the curved mounting of the dog in that where the cant or log is thrown against the knee, the dogs in the path of such cant or log are immediately forced inwardly and upwardly without, however, affecting the dogs which are beyond this plane. It may well be that this inward and upward movement of the dogs will cause the tooth end of the dog to rise above the log or cant, for in the inward movement of the dog, the tooth end must necessarily move upwardly. This independence of the dogs and their upwardly and inwardly curved mounting therefore tends to the independence in dog movement necessary to avoid breakage and insures the absolute rigidity of the dogs when engaged in a log insofar as relative outward movement with respect to the face of the knee is concerned. The dogs when engaged in a log cannot possibly move outwardly with respect to the face of the knee and the log is rigidly held against the face of the knee.

From the foregoing description, it will be seen that I have provided a dog and dog mounting whereby the dog will yield under log contact in any position the log is thrown against the dog, and therefore breakage or damage to the dogs by log contact is effectually prevented.

What I claim is:

1. In combination, a knee, a dog guideway carried by the knee and cruved inwardly and upwardly with respect to the face of the knee, a dog including a shank slidably fitting in and curved in correspondence with that of the guideway, power means for the dog, and a yielding connection between the power means and dog.

2. In combination, a knee, a dog guideway carried by the knee and curving inwardly and upwardly with respect to the knee, and a dog having a shank slidably fitting in and curved in correspondence with that of the guideway, the curvature of the guideway being such as to compel a movement of the operative point of the dog in a combined downward and outward direction during operative movement of the dog to engage a log, whereby following such engagement the dog and thereby the log is rigidly held against further outward movement with respect to the face of the knee.

3. In combination, a knee, a guideway carried thereby and inwardly and upwardly curved with respect to the face of the knee, a dog having a shank slidably fitting in and curved in correspondence with that of the guideway, a power means for operating the dog, a rod connected to the power means and having sliding connection with the dog, and a spring mounted in the rod to insure movement of the dog in the operation of the power means while permitting yielding movement of the dog in one direction independent of the power means.

4. In combination, a knee, a dog guideway therein curved inwardly and upwardly with respect to the face of the knee, a dog having a shank slidably fitting in and curved in correspondence with that of the guideway, a power means for the dog, an eye pivotally connected to the dog, a rod connected to the power means and extending through the eye, and a spring encircling the rod and bearing against the eye, whereby the power means may actuate the dog through the spring while at the same time permitting independent movement of the dog in one direction irrespective of the power means.

5. In combination, a knee, a frame, a guideway in the frame curved upwardly with respect to the face of the knee, a dog mounted in the curved guideway, the end of the dog beyond the guideway being inclined downwardly and outwardly from the guideway, and a spring for holding the dog in projected position.

6. In combination, a knee for a saw mill carriage, a dog carrying frame mounted in the knee, a group of guideways on said frame, said guideways being on curved planes whose centers are above the guideways and in advance of the face of the knee, and dogs fitting and slidable in said guideways.

In testimony whereof I affix my signature.
GEORGE M. PELTON.